United States Patent [19]

Schroeder et al.

[11] Patent Number: 4,478,657
[45] Date of Patent: Oct. 23, 1984

[54] METHOD FOR STRENGTHENING DUCT CORES

[75] Inventors: Clifford A. Schroeder, Westlake; Ralph L. Fogg, Chatsworth, both of Calif.

[73] Assignee: C. A. Schroeder, Inc., San Fernando, Calif.

[21] Appl. No.: 456,336

[22] Filed: Jan. 6, 1983

[51] Int. Cl.³ .................. B65H 81/00; F16L 11/11
[52] U.S. Cl. .................. 156/64; 138/122; 138/131; 138/139; 156/143; 156/165; 156/195; 156/229
[58] Field of Search ............ 156/143, 144, 160, 161, 156/165, 162, 215, 195, 433, 434, 495, 229, 428, 429, 494, 391, 392, 545, 64, 191, 378, 199, 212, 302; 138/139, 128, 156, 158, 172, 121, 122, 173, 133, 151; 73/826, 827

[56] References Cited

U.S. PATENT DOCUMENTS

| | | | |
|---|---|---|---|
| 2,963,749 | 12/1960 | Pavlic | 18/59 |
| 2,968,321 | 1/1961 | Kahn | 138/56 |
| 3,023,787 | 3/1962 | Phillips et al. | 138/121 |
| 3,216,459 | 11/1965 | Schroeder et al. | 138/139 |
| 3,245,852 | 4/1966 | Martin et al. | 156/86 |
| 3,391,041 | 7/1968 | Moore | 156/174 |
| 3,832,260 | 8/1974 | Straughan et al. | 156/390 |
| 4,108,212 | 8/1978 | Anderson et al. | 138/122 |

Primary Examiner—Michael Ball
Attorney, Agent, or Firm—David O'Reilly

[57] ABSTRACT

A method and apparatus for strengthening the core of an insulated flexible duct formed of a helical wire wrapped with a flexible material. Strengthening tape is applied to the surface of the duct along its entire length. The apparatus for applying the strengthening tape is a tray having adjustable wiping arms. The wiping arms stretch the duct out as it is pulled through the tray, testing bonds securing the material around a reinforcing coil of wire. A roll of tape is mounted adjacent to the wiper arms and is automatically applied as the duct is pulled along the tray through the wiper arms. At least two wiper arms and continuous strips of tape along the longitudinal surface of the duct core are preferred.

8 Claims, 3 Drawing Figures

METHOD FOR STRENGTHENING DUCT CORES

FIELD OF THE INVENTION

This invention relates to insulated flexible duct and more particularly relates to improvements in forming and strengthening the wire reinforced core.

BACKGROUND OF THE INVENTION

Flexible insulated ducts are formed of a wire reinforced core wrapped in a blanket of insulating material covered with a flexible sleeve. The core is formed of a continuous coil of wire, usually covered by a flexible plastic material. Methods and apparatus for forming such ducts are shown in U.S. Pat. Nos. 3,216,459 and 4,351,682 incorporated herein by reference.

A problem with many of the synthetic plastic materials used to form the core is that while they may have high stretch resistance (i.e. tensile strength), they often have very low tear resistance. That is, while these materials may have high tensile strength, if a tear or cut begins it can quickly migrate or spread until the entire core unravels. Thus, a tear once started may continue to spread until the entire reinforcing wire helix comes apart, rendering the insulated duct useless. It would be advantageous if such tears or cuts could be stopped from spreading. Small tears, if prevented from spreading, would have little effect on the efficiency or function of the insulated duct.

Therefore, it is one object of the present invention to provide a method of strengthening the wire reinforced core of insulated flexible duct.

Another object is to provide a method of applying a strong tape to the duct core to strengthen it.

Yet another method is to provide an apparatus for applying reinforcing tape along the longitudinal surface of a duct core.

Still another object is to provide an apparatus for applying strengthening tape simultaneously while testing the strength of material bonds in a flexible duct core.

SUMMARY OF THE INVENTION

A method and apparatus for strengthening flexible duct in which strengthening tape is applied along the longitudinal length of the flexible duct core. At least two strips of high tensile strength tape is applied to the surface of the flexible duct core along its entire length. For small diameter ducts, two strips of strengthening tape are applied on opposite sides while for larger duct, preferably three or four strips of tape are applied, approximately equally spaced around the diameter.

In order to apply the strengthening tape along the length of the flexible duct core, it must be stretched out tightly. Normally this flexible duct core is stretched tightly to test material bonds immediately after predetermined lengths or sections of duct are manufactured. It was therefore thought advantageous to combine the operation of testing the duct for material bonds around the reinforcing wire simultaneously with application of the strengthening tape.

For this purpose, a jig or test structure apparatus was constructed comprised of a tray having a trough for receiving a length of manufactured cylindrical flexible duct. Positioned adjacent to the trough are a plurality of arms having resilient wipers for engaging the flexible duct core. The duct core is pulled through these wipers, stretching it tightly to test bonds of material around the reinforcing wire core. To apply the strengthening tape, rolls of tape are positioned adjacent to the wipers, passed beneath the wipers and pressed against the side of the flexible duct core as it passes through the wipers. Once the end of the tape is secured to the flexible duct core, it is pressed tightly against the side of the duct as it passes between the wipers and is pulled tightly to test bonding of material.

For small diameter ducts, there are two adjustable arms having wipers for pulling the flexible duct core tight as it is stretched along the trough. For larger diameter flexible duct cores, a third or fourth arm may be attached and engage the flexible duct core. Each arm is adjustable to accommodate different diameter ducts and apply the strips of strengthening tape approximately equally spaced around the diameter. Thus, a tear occurring in the material of the flexible duct core may not spread any more than the distance between strips of strengthening tape, which is less than half the circumference.

The above and other objects, advantages and novel features of the invention will be fully understood from the following detailed description when considered in conjunction with the accompanying drawings in which:

DETAILED DESCRIPTION OF THE INVENTION

Figure 1:
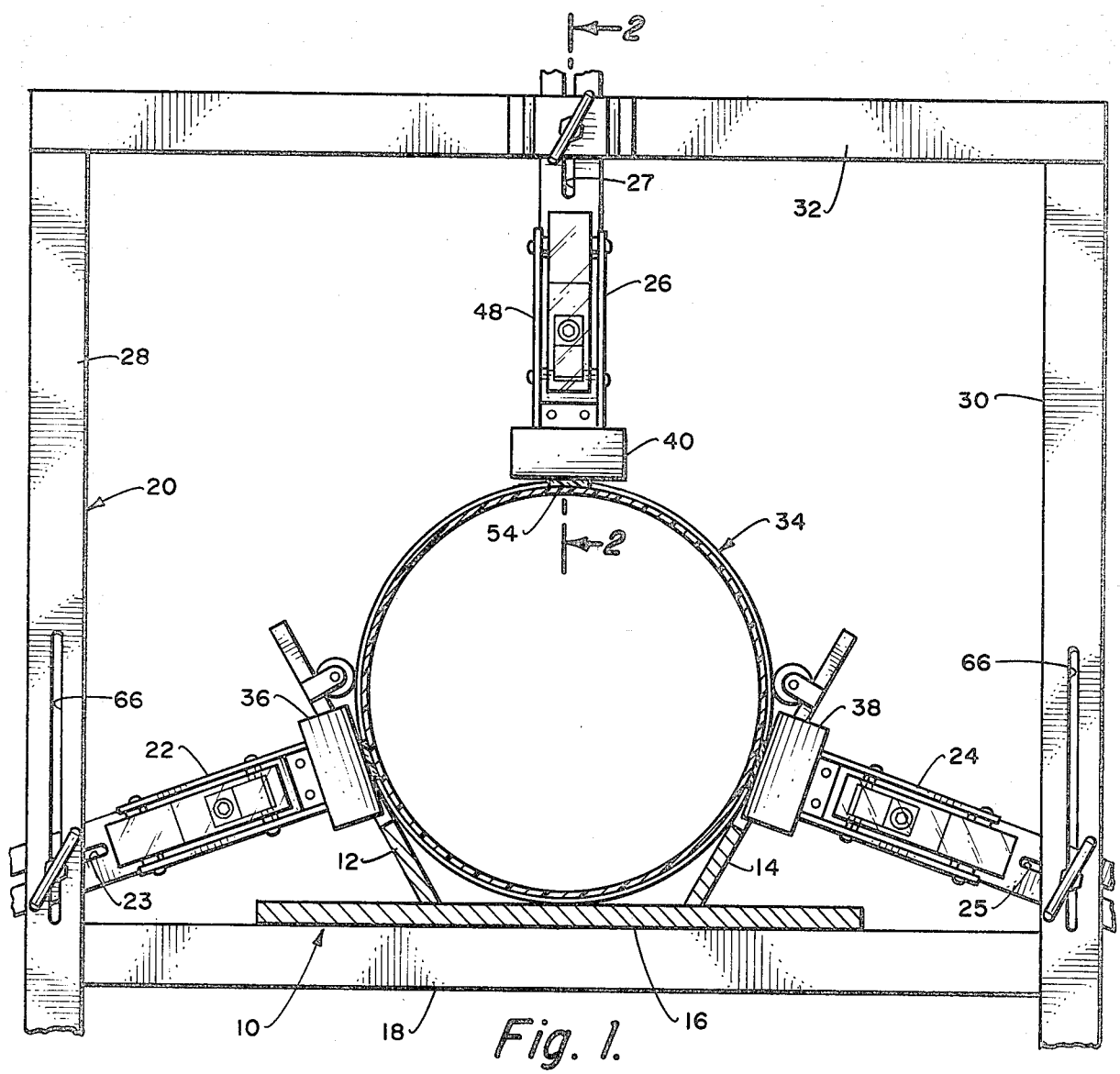
FIG. 1 is an end view illustrating the method and apparatus for testing and applying strengthening tape to a flexible duct core.

The apparatus for accomplishing the method of the invention is illustrated in FIG. 1 and is comprised of a tray generally indicated at 10 having an elongate trough formed by angled members 12 and 14 supported on a bed 16. The tray 10 is supported along its length at various points by cross members 18. The tray 10 has a length sufficient to stretch a section of flexible duct core out to near its full length.

Positioned along the length of the tray 10 is a frame 20 for supporting arms 22, 24 and 26. The frame 20 is attached to cross member 18 and has upright members 28 and 30 and cross member 32. Preferably the frame 20 is positioned approximately mid-way along the length of the tray 10. The trough formed by the angled members 12 and 14 has a space or interruption so that the arms 22 and 24 may engage the sides of a flexible duct core 34. Each arm 22, 24, 26 respectively is radially adjustable with the arms 22 and 24 also being vertically adjustable. Slots 23, 25, 27 in each arm respectively allow radial adjustment.

Figure 2:
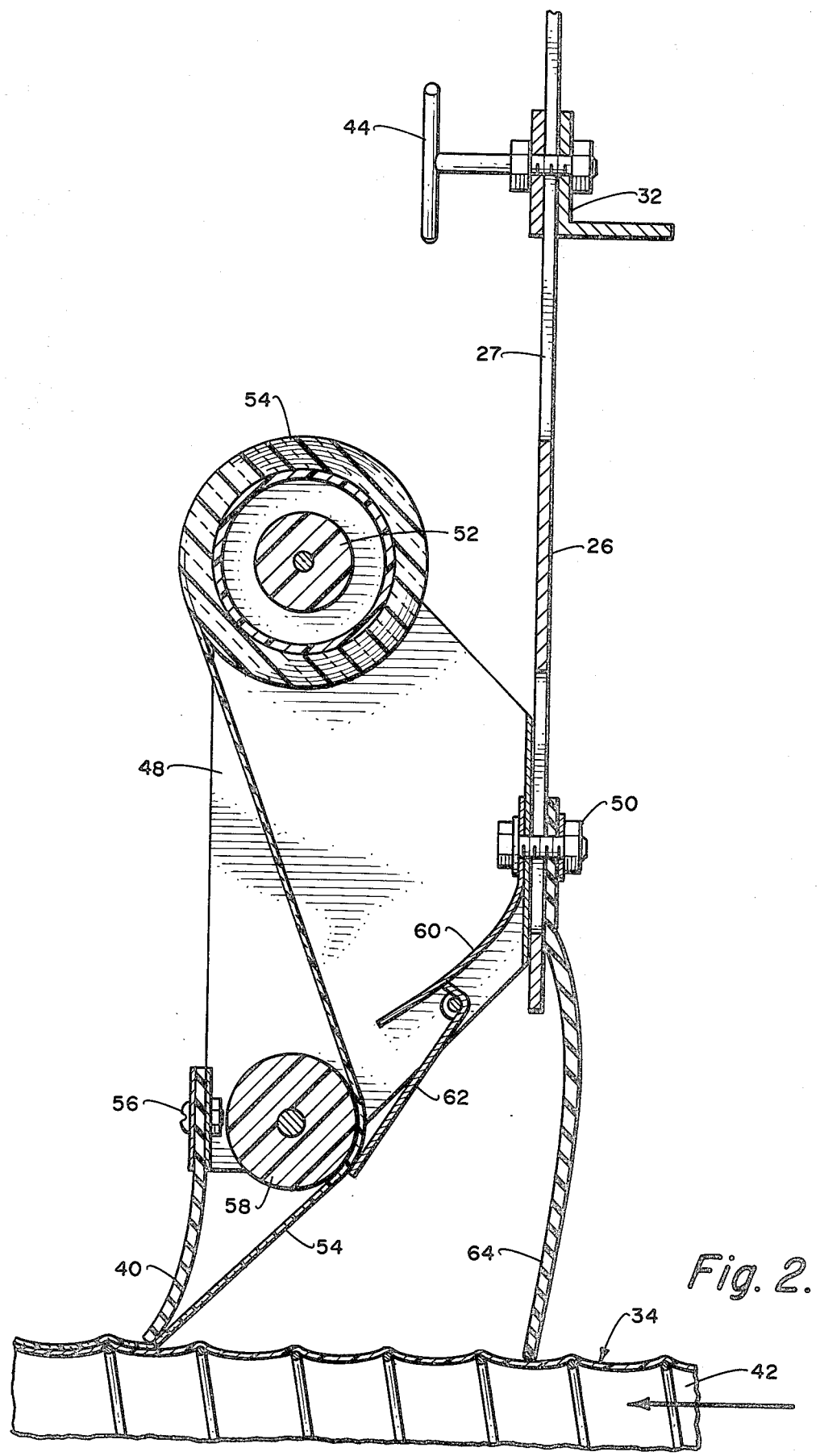
FIG. 2 is a sectional view taken along 2—2 of FIG. 1.

Each of the arms 22, 24 and 26 is provided with at least one resilient wiper 36, 38 and 40 respectively for engaging and following the contour of the flexible duct core 34. As the flexible duct core 34 is pulled from one end of the tray 10 through the arms 22, 24 and 26 to the other end of the tray (not shown), the arms follow the contour of the duct stretching it tightly (FIG. 3) to test the material bonding around the reinforcing wire 42 (FIG. 2). The operation of the wiper arms 22, 24 and 26 can be more clearly seen in the sectional view of FIG. 2. The wiper arm 26 is adjustably attached to the frame member 32 by means of a tightening wing bolt 44. By unscrewing the wing bolt 44, the arm 26 can be loosened or completely removed. Note that the arm 26 has a slot 27 permitting radial adjustment. This permits the arm to be adjusted for various diameter ducts. Each of the other arms has a similar slot 23 and 25 respectively.

Each arm has a tape dispenser 48 securely bolted to the arm at 50. A roll of tape 54 is mounted on roller 52 in dispenser 48. Wiper 40 is securely attached to the lower end of the dispenser 48 on each arm by a screw 36. AS the flexible duct core is moved in the direction indicated by the arrow, each wiper 40 follows the contour of the duct, stretching the duct tightly between the coils of reinforcing wire 42. Wipers 40 simultaneously apply the tape 54 along the longitudinal surface of the flexible duct core 34. The tape 54 is fed from the roller 52 under second roller 58 and under wiper 40 to be pressed securely against the side of the flexible duct core 34. Pressure spring 60 and pressure bracket 62 apply a light pressure to keep the tape properly positioned.

To assist in prestretching the flexible duct core, a second wiper 64 may be provided on each arm also secured to the arm 26 by the bolt 50. The second wiper 64 prestretches the flexible duct core 34 before it reaches the tape and first wiper 40. Thus, the web of material between each coil of wire 42 is stretched prior to reaching the tape. This assures the tape being firmly adhered to the side of the flexible duct consistently along its entire length.

Figure 3:
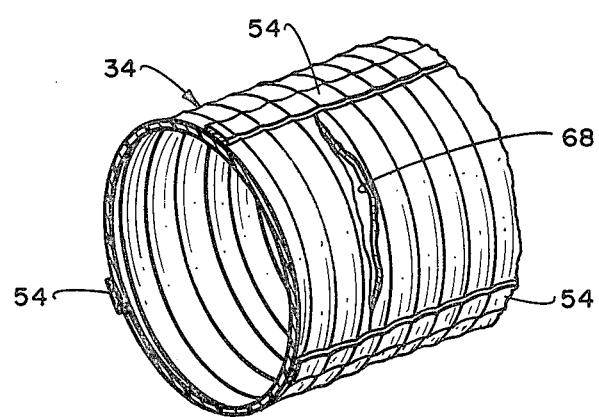
FIG. 3 illustrates a section of flexible duct core having a tear after strengthening tape has been applied.

As can be seen in FIGS. 1 and 3, three strips of tape are being applied. However, for smaller duct sizes only two strips of tape will be necessary. Thus, slots 66 in vertical members 28 and 30 of frame 20 permit arms 22 and 24 to be adjusted vertically to engage the duct on opposite sides. For large duct (e.g. to 12 to 20 inches) the third arm 26 is utilized to apply a third strip of tape. Obviously, a fourth strip at the bottom could be added, if desired.

The tape is preferably a plastic tape having a pressure sensitive adhesive which has high tensile strength. For example, a polyolefin tape, having an acrylic adhesive, is suitable. Another suitable tape is strapping material formed of a glass fabric reinforced tape having a pressure sensitive adhesive.

As can be seen in FIG. 3, three strips of tape have been applied to strengthen the material wrapped around the wire reinforced core 34. This prevents tears such as that shown at 68 from spreading to unravel the reinforcing wire 42, effectively ruining the flexible insulated duct formed with this core.

Thus, there has been described a method and apparatus for testing the strength of bonds in forming flexible duct core, as well as applying tape to strengthen the core. The apparatus for applying the strengthening tape is adjustable to accommodate small size duct as well as extremely large ducts.

This invention is not to be limited to the embodiment shown in the drawings and described in the description, which is given only by way of example and not of limitation but only in accordance with the scope of the appended claims.

What is claimed is:

1. A method of simultaneously testing and strengthening a flexible duct core of a wire coil helically wrapped with a flexible material comprising:
   positioning said flexible duct core in an elongated tray;
   engaging the sides of said flexible duct core with at least two arms having resilient wipers;
   pulling said flexible duct core through said resilient wipers to stretch and test material bonds;
   applying strengthening tape longitudinally to the surface of said flexible duct core as it passes between said wipers;
   whereby said wipers press said tape securely to the sides of said flexible duct core as it is stretched and tested in said tray.

2. The method according to claim 1 comprising three of said arms having three wipers; said three wipers applying three strips of strengthening tape along the longitudinal length of said flexible duct core.

3. The method according to claim 2 including adjustably supporting said arms whereby said arms may be adjusted to accommodate different diameter flexible duct cores.

4. A method of strengthening a flexible duct core comprised of a continuous coil of reinforcing wire helically wrapped with and bonded to a flexible plastic material thereby forming an axial compressible tube comprising;
   stretching said flexible tube core lengthwise to tighten said flexible material between said coils of reinforcing wire;
   applying at least one strip of high tensile strength tape longitudinally to the surface of said flexible material;
   pressing said tape securely against the surface of said flexible material as said flexible tube core is stretched;
   whereby tears in the flexible material are prevented from spreading.

5. The method according to claim 4 comprising applying at least two spaced apart strips of said strengthening tape.

6. The method according to claim 4 in which the step of strectching said flexible tube lengthwise comprises;
   positioning a compressed length of flexible duct lengthwise in an elongated tray;
   grasping a free end of said flexible duct;
   pulling said flexible duct through an opening formed by a pluality of resilient wiping means extending radially into resilient contact with the surface of said flexible duct;
   whereby said flexible duct core is stretched to tighten said flexible material as it passes through said opening.

7. The method according to claim 6 including mounting said resilient wiping means on radially adjustable arms whereby the size of the opening can be increased or decreased to accomodate different diameter flexible ducts.

8. The method according to claim 7 including mounting tape dispensing means adjacent each of said resilient wiping means; applying said tape to the surface of said flexible duct core as it passes beneath said resilient wiping means; whereby said resilient wiping means stretches said flexible duct core and simultaneously presses said tape firmly on said surface.

* * * * *